United States Patent [19]
Fegen

[11] 3,909,883
[45] Oct. 7, 1975

[54] LOCKING BASE FOR PLASTIC COMPONENTS

[75] Inventor: James F. Fegen, Chicago, Ill.

[73] Assignee: Richco Plastic Company, Chicago, Ill.

[22] Filed: Nov. 30, 1973

[21] Appl. No.: 420,704

Related U.S. Application Data

[62] Division of Ser. No. 229,800, Feb. 28, 1972, Pat. No. 3,777,052.

[52] U.S. Cl. ............... 24/73 P; 174/138 D; 85/5 R
[51] Int. Cl.² ......................................... A44B 21/00
[58] Field of Search ........... 24/73 P, 73 PM, 73 PF, 24/73 HJ, 73 R, 73 AP, 208, 213, 221 L, 221 R; 174/138 D, 40 CC, 158 R, 164; 85/5 R, 5 P, 80, DIG. 2, DIG. 14; 248/71, 73, 223; 317/101 R, 101 CH, 101 D, 101 DH

[56] References Cited
UNITED STATES PATENTS

| | | | |
|---|---|---|---|
| 2,836,215 | 5/1958 | Rapata | 24/73 PF |
| 3,154,281 | 10/1964 | Frank | 174/40 CC |
| 3,574,899 | 4/1971 | Fisher | 24/73 PF |
| 3,651,545 | 3/1972 | Hara | 24/73 P |

*Primary Examiner*—Geo. V. Larkin

[57] ABSTRACT

A support for mounting plastic components on an apertured panel comprising a base for resiliently bearing a component integral therewith on the panel, a stem extending from the base through the aperture, diverging yieldable wings on the free end of the stem, and extensions on each wing having shoulders adapted to seat against the sides of the aperture and the undersurface of the panel.

7 Claims, 3 Drawing Figures

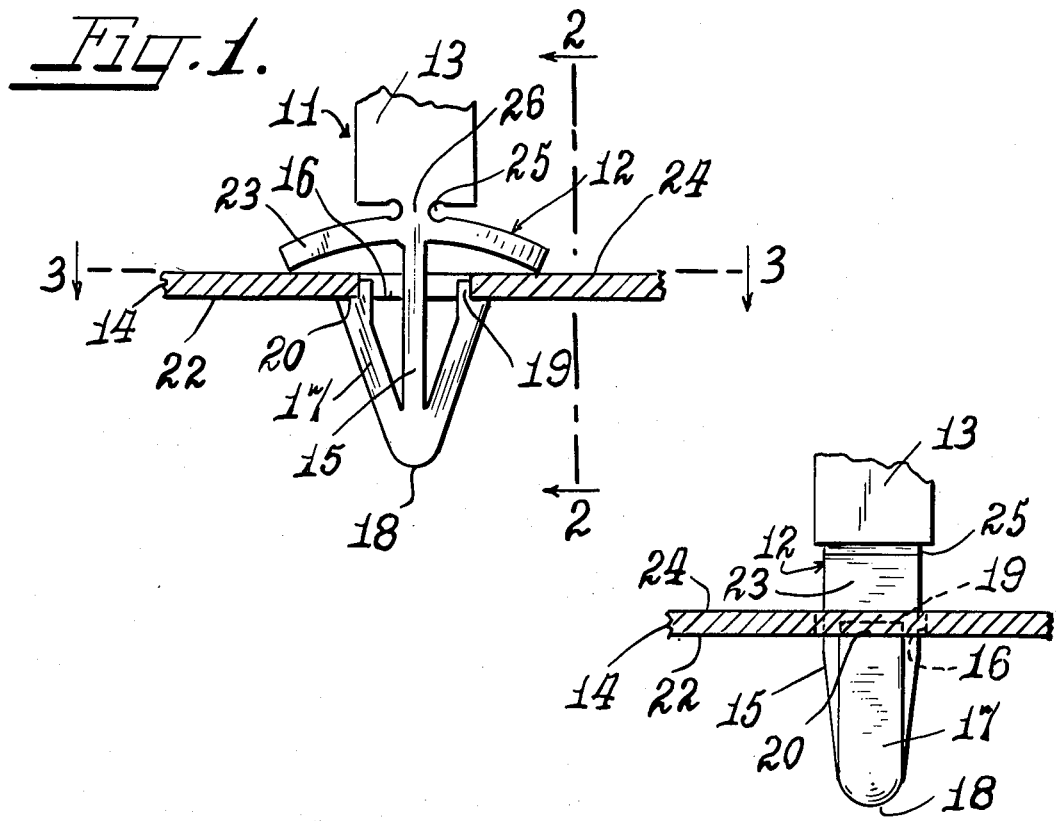
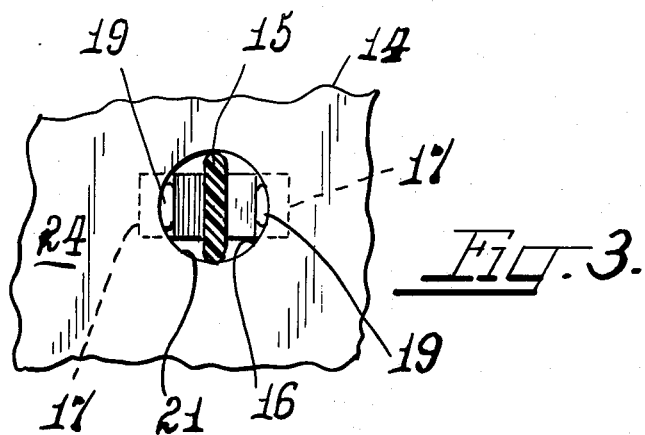

LOCKING BASE FOR PLASTIC COMPONENTS

This application is a division of my prior co-pending application Ser. No. 229,800 filed Feb. 28, 1972, now U.S. Pat. No. 3,777,052 for a SUPPORT FOR CIRCUIT BOARDS.

BACKGROUND OF THE INVENTION

This invention relates to supports for mounting plastic components in electrical and electronic equipment having apertured panels therein; and is more particularly directed to the locking base portion or support which may be integrally molded from plastic and coupled with a component member, such as a fastener, wire saddle, cable clamp, circuit board support, component clip or the like, for removably and resiliently securing the component on the panel.

The novel support comprises a base for resiliently bearing the component member integral therewith on an apertured panel, a stem extending from the base through the aperture, diverging yieldable wings integral with the free end of the stem, and extensions on each wing having shoulders adapted to seat against the sides of the aperture and the undersurface of the panel. The device may be snap fitted onto the apertured panel, positively locked against any unintended displacement, and easily removed by drawing the wings together to free the shoulders from the panel for withdrawal of the stem and its associated parts from the aperture.

It is therefore an object of the invention to provide a support for plastic components of one piece construction which may be integrally molded with a component and which includes positive support locking means.

Another object of the invention is to provide a support which will resiliently hold the component on an underlying panel in a selected position, and which will permit the component to be detachably secured on the panel.

Another object of the invention is to provide a molded one piece component and support which is easy to manufacture and simple to use without installation hardware or tools.

Other objects and advantages of the invention will become apparent as this description proceeds, taken in conjunction with the accompanying drawings.

DESCRIPTION OF THE DRAWINGS

In the drawings:

FIG. 1 is a side elevational view of the support, with the panel in section and the component broken away.

FIG. 2 is an elevational view of the support shown in FIG. 1, taken on line 2 — 2 thereof.

FIG. 3 is a sectional view of the support, taken on line 3 — 3 of FIG. 1.

SUMMARY OF THE INVENTION

The support 11 comprises a base 12 for resiliently bearing a component 13 (balance of component not shown) molded integrally therewith on an apertured panel 14, a stem 15 extending from the base through the aperture 16, diverging wings 17 integral with the free end 18 of the stem, and extensions 19 on each wing. Each extension has a shoulder 20 adapted to seat against the side wall 21 of aperture 16 and the undersurface 22 of panel 14. Base 12 preferably has opposed free ends 23 each arched toward the shoulders 20 and adapted to resiliently bear upon the surface 24 of panel 14. Additional resiliency may be imparted to base 12 by providing flexure grooves 25 in the web 26 connecting base 12 to component 13.

Support 11 and aperture 16 are dimensioned relative to one another to permit stem 15 to enter and substantially fill the diameter of the aperture 16, and thereby prevent radial movement of the device. Variations in thickness of panel 14 may be accommodated by the resilient bearing of base ends 23 on surface 24 and shoulders 20 on undersurface 22 of the panel.

The support is snap-fitted into the panel aperture with the wings 17 being collapsed toward stem 15 to clear the walls 21 of aperture 16; and after insertion the wings 17 expand until extensions 19 rest on the inside walls 21 of aperture 16 and against the undersurface 22 of panel 14. When force is exerted to pull the support out of the aperture, shoulders 20 bear against the inside walls of the aperture and the undersurface of the panel, thereby preventing the wings 17 to spread open.

Removal of support 11 may be accomplished by pinching wings 17 toward the stem 15, and withdrawal of shoulders 20 from the panel undersurface and aperture walls until the stem and wings have been returned through the aperture.

Preferably, the support and component are injection molded in one piece from nylon or other moldable resilient materials having dielectric insulating properties.

While I have illustrated and described a preferred embodiment of the invention, it is apparent that various changes and modifications in the details of the structure may be made without departing from the spirit or scope of the invention. Accordingly, I do not desire to be limited to the exact construction described and illustrated.

I claim:

1. In a support integral with a component and a panel having a circular aperture therein for mounting the component on one face of the panel, said support comprising a resilient substantially elongated base connected to the component and having opposed free ends arched in the direction of the panel, a stem extending centrally from the base and through the aperture, a pair of yieldable wings integral with and extending from the free end of said stem toward said panel, said wings having diverging free ends one aligned with each of said base ends and normally spread beyond the perimeter of said circular aperture, an extension on the free end of each wing adapted to enter the aperture when the support is mounted, said extensions and said wing ends being contoured to bear against the perimeter of said aperture and said panel to prevent spreading of said wings and to center said support in the aperture when the support is mounted on the panel.

2. The support recited in claim 1, wherein the base comprises a flexible substantially rectangular member having its opposed ends arched in the direction of the panel.

3. The support recited in claim 2, wherein a web connects the base and component and is weakened to increase flexibility of the base member.

4. The support recited in claim 1, wherein the stem is of sufficient width in one direction to substantially bridge the aperture to prevent its shifting laterally.

5. The support recited in claim 1, wherein the support and component are molded from plastic dielectric insulating material.

6. The support recited in claim 1, wherein said extension is substantially parallel to the walls of said aperture.

7. The support recited in claim 4, wherein the wings are disposed in a plane angular to the width of the stem.

* * * * *

REEXAMINATION CERTIFICATE (422nd)
United States Patent [19]
Fegen

[11] B1 3,909,883
[45] Certificate Issued  Nov. 19, 1985

[54] LOCKING BASE FOR PLASTIC COMPONENTS

[75] Inventor: James F. Fegen, Chicago, Ill.

[73] Assignee: Richco Plastic Company, Chicago, Ill.

Reexamination Request:
No. 90/000,091, Oct. 20, 1981

Reexamination Certificate for:
Patent No.: 3,909,883
Issued: Oct. 7, 1975
Appl. No.: 420,704
Filed: Nov. 30, 1973

Related U.S. Application Data

[62] Division of Ser. No. 229,800, Feb. 28, 1972, Pat. No. 3,777,052.

[51] Int. Cl.[4] .............................................. A44B 21/00
[52] U.S. Cl. .................................... 174/138 D; 411/508
[58] Field of Search ............... 411/508, 509, 510, 548; 24/213 R, 214, 213 B, 295, 297; 174/138 D; 339/126 RS, 128

[56] References Cited

U.S. PATENT DOCUMENTS

| | | |
|---|---|---|
| 2,171,925 | 9/1939 | Fitts . |
| 2,246,720 | 6/1941 | Churchill . |
| 2,391,298 | 12/1945 | Davis . |
| 2,424,757 | 7/1947 | Klump . |
| 2,692,414 | 10/1954 | Poupitch . |
| 2,758,498 | 8/1956 | Johnson . |
| 2,836,215 | 5/1956 | Rapata ................ 339/126 RS X |
| 3,029,486 | 4/1962 | Raymond . |
| 3,040,401 | 6/1962 | Von Rath . |
| 3,154,281 | 2/1962 | Frank ............................ 24/214 X |
| 3,205,546 | 9/1965 | Nelson ............................ 24/213 B |
| 3,309,955 | 3/1967 | Turnbull et al. . |
| 3,342,095 | 9/1967 | Buntic |
| 3,373,463 | 3/1968 | Wells . |
| 3,412,437 | 11/1968 | Bennett . |
| 3,550,217 | 12/1970 | Collyer ............................ 411/509 |
| 3,577,603 | 9/1969 | Seckerson et al. .............. 411/510 |
| 3,611,861 | 10/1971 | Schulze ............................ 411/508 |
| 3,621,751 | 11/1971 | Fiorentino . |
| 3,631,738 | 1/1972 | Harper . |
| 3,651,545 | 3/1972 | Hara ............................ 411/548 |
| 3,678,797 | 7/1972 | Seckerson . |
| 3,688,635 | 9/1972 | Fegen ............................ 339/128 X |
| 3,777,052 | 12/1973 | Fegen ............................ 174/138 D |

FOREIGN PATENT DOCUMENTS

2013147  3/1970  Fed. Rep. of Germany .

*Primary Examiner*—Thomas J. Holko

[57] ABSTRACT

A support for mounting plastic components on an apertured panel comprising a base for resiliently bearing a component integral therewith on the panel, a stem extending from the base through the aperture, diverging yieldable wings on the free end of the stem, and extensions on each wing having shoulders adapted to seat against the sides of the aperture and the undersurface of the panel.

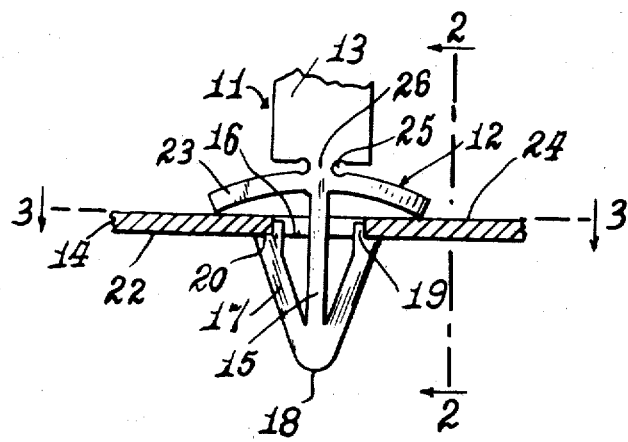

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2 lines 4-10:

Support 11 and aperture 16 are dimensioned relative to one another to permit stem 15 to enter and substantially fill the diameter of the aperture 16, and thereby prevent radial movement of the device. *Stem 15 has a substantially constant width end and a tapered end, as best shown in FIG. 2, and the constant width end extends substantially ½ the length of stem 15.* Variations in thickness of panel 14 may be accommodated by the resilient bearing of base ends 23 on surface 24 and shoulders 20 on undersurface 22 of the panel.

AS A RESULT OF REEXAMINATION, IT HAS BEEN DETERMINED THAT:

Claim 4 is cancelled.

Claims 1 and 6 are determined to be patentable as amended.

Claims 2, 3, 5 and 7, dependent on an amended claim, are determined to be patentable.

1. In a support integral with a component and a panel having *upper and lower surfaces and* a circular aperture therein for mounting the component on one *surface* [face] of the panel, said support comprising:
   (a) a resilient substantially elongated base [connected to the component and having opposed free ends arched in the direction of the panel,] *having a length greater than its width and connected to the component, a stem, and a pair of yieldable wings,*
   (b) said [a] stem extending centrally from *said* [the] base *and having an upper end and a lower end* [and through the aperture],
   (c) *said elongated base integral with the upper end of said stem and having free ends extending an equal distance from either side of said stem and having a combined length substantially exceeding said circular aperture diameter,*
   (d) *said free ends of said base being arched in the direction of said panel and terminating in tips,*
   (e) *said stem having a width substantially equal to said circular aperture diameter to substantially span said aperture when inserted therein,*
   (f) *said stem having a longitudinal axis, being flat and providing substantial clearance on either side thereof with the walls of said aperture,*
   (g) *the upper end of said stem having a uniform width and the lower end of said stem being tapered and said uniform width upper end being of sufficient length to extend beyond said panel lower surface when said support is positioned in said panel,*
   (h) *said stem being solid and uninterrupted in cross-section throughout its length and having an apex,*
   (i) the lower end of said stem having said [a] pair of yieldable wings [integral with and extending from the free end of said stem toward said panel,] *integrally connected to said apex and projecting angularly upwardly from said apex free of said stem toward and in alignment with said free end of said base on either side of said stem,*
   (j) said wings having diverging free ends [one aligned with each of said base ends and normally spread beyond the perimeter of said circular aperture,] and tips thereon and being of a width substantially less than the diameter of said aperture and substantially equal to the width of said stem at said apex,
   (k) *said wings having an inside surface and an outside surface,*
   (l) *the distance between said inside surfaces of said wings at their free ends being less than the diameter of said aperture and the distance between the outside surfaces of said wings at their free ends being greater than the diameter of said aperture,*
   (m) said wings at their free ends each including a shoulder engageable with the lower surface of said panel at said *aperture and* an extension [on the free end of each wing] adapted to enter the aperture when the support is mounted, [said extensions and said wing ends being contoured to bear against the perimeter of said aperture and said panel to prevent spreading of said wings and to center said support in the aperture when the support is mounted on the panel]
   (n) *said constant width end of said stem extending a substantial distance below said shoulders,*
   (o) *said stem being of sufficient length so that a portion of said stem projects out of said aperture and beyond said upper surface of said panel when said support is positioned in said aperture and said shoulders of said wings free ends engage said lower surface of said panel,*
   (p) *and said base being arched and spaced from said panel when said support is in final position in said aperture to provide tip contact only with said upper surface of said panel to thereby provide yielding action to said support when mounted in said panel in a direction substantially parallel to the axis of said stem.*

6. The support recited in claim 1, wherein said *tips being* [extension is] substantially parallel to the walls of said aperture.

* * * * *